2 Sheets--Sheet 1.

J. KOONS.

Grain-Separators.

No. 5,899. Reissued June 2, 1874.

*Witnesses.*

D. P. Cowl

Edmund Masson

*Inventor.*

Joseph Koons,

By Atty. A. B. Stoughton.

AM. PHOTO-LITHOGRAPHIC CO. N. Y. (OSBORNE'S PROCESS.)

2 Sheets--Sheet 2.
J. KOONS.
Grain-Separators.
No. 5.899. Reissued June 2, 1874.
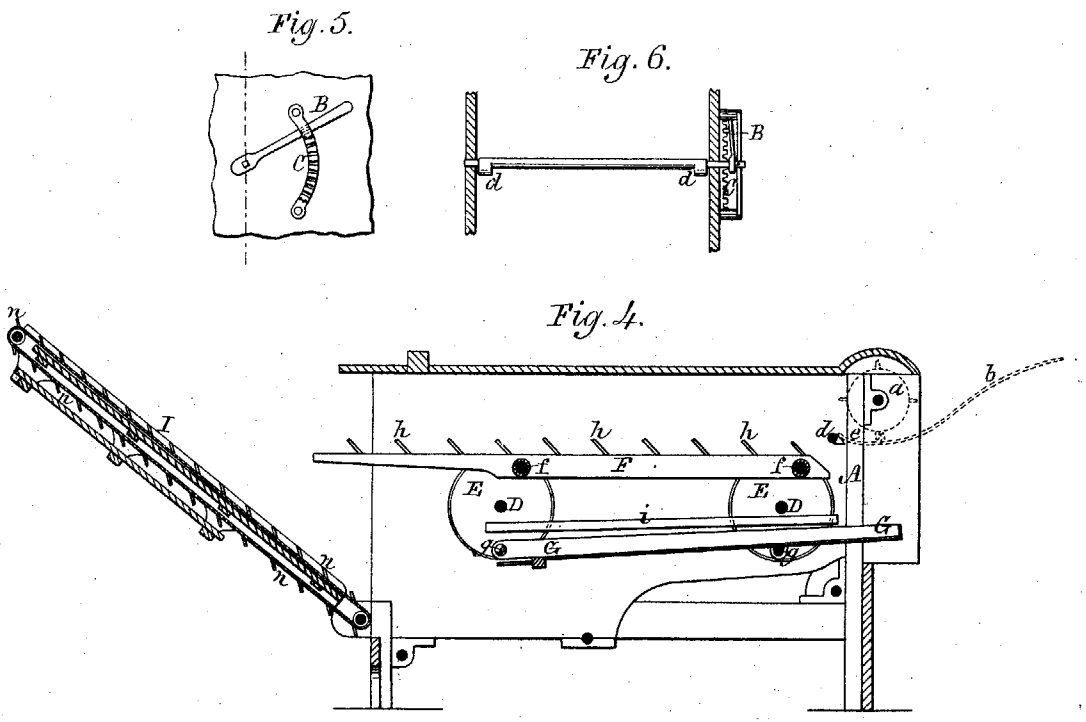
Witnesses
D. R. Cowl
Edmund Masson
Inventor.
Joseph Koons.
By atty. A. B. Stoughton.
AM. PHOTO-LITHOGRAPHIC Co. N. Y. (OSBORNE'S PROCESS.)

UNITED STATES PATENT OFFICE.

JOSEPH KOONS, OF NEW AUBURN, MINNESOTA.

IMPROVEMENT IN GRAIN-SEPARATORS.

Specification forming part of Letters Patent No. 143,081, dated September 23, 1873; reissue No. 5,899, dated June 2, 1874: application filed April 8, 1874.

*To all whom it may concern:*

Be it known that I, JOSEPH KOONS, of New Auburn, in the county of Sibley and State of Minnesota, have invented certain new and useful Improvements in Grain-Separators; and that the following is a full, clear, and exact description of the same, reference being had to the accompanying drawings making a part of this specification, in which—

Figure 1:
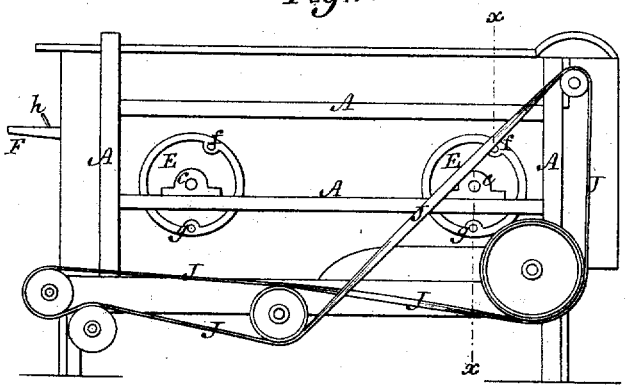
Figure 2:
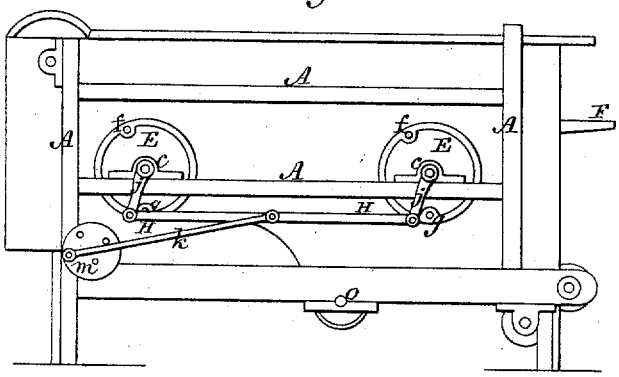
Figure 3:
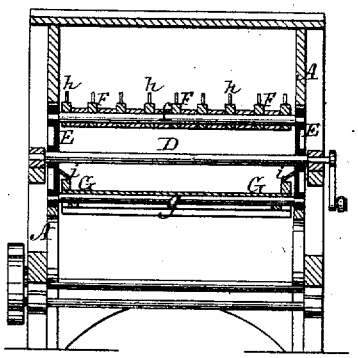

Figure 1 is a view of one side of the separator, showing the arrangement of the driving-belt and pulleys. Fig. 2 is a view of the opposite side of the machine. Fig. 3 is a vertical cross-section taken through the machine at the dotted line *x x* of Fig. 1. Fig. 4 is a vertical longitudinal section of the machine. Figs. 5 and 6 represent details which will be hereinafter more fully referred to.

My invention has for its object to furnish an improved grain-separator, which shall be so constructed as to thoroughly separate the grain from the straw as it comes from the thrasher, clean the grain and remove it, carry the straw out of the machine, and deposit it upon the stack; and my invention consists, first, in the combination of the pairs of rolling or reciprocating heads, fitting within circular openings in the casing, with the agitating-carrier and conveyer pivoted thereto, so that the rocking or rolling of said heads shall impart, to both the carrier and conveyer, in addition to their forward and rearward motions, an approaching and receding movement, as and for a purpose to be hereafter explained. It further consists in the combination of the rolling or reciprocating heads, the pivoted carrier and conveyer, the crank-wrists, and coupling-bar connected to said crank-wrists, for the purpose of imparting a positive and simultaneous movement to both of the heads, and to each of the ends of the carrier and of the conveyer.

To enable others skilled in the art to make and use my invention, I will proceed to describe the same with reference to the drawings.

In the drawings, I have shown my grain-separator as connected to or with a thrashing-cylinder and concave at the front of the machine, (calling that the front where the material to be acted upon is fed in,) and with a stacker at the rear end, for taking the straw, after the grain has been separated therefrom, and carrying it up or out from the machine to the place where it is to be stacked.

The frame of the machine is represented at A. At the front end of the machine is shown in dotted lines a thrashing-cylinder, *a*, and an apron, *b*, for feeding grain that is to be thrashed thereto, and a concave, *e*, which latter can be adjusted to the cylinder by means of a cam or cams at *d*, to the axis or shaft of which a lever, as at B, Fig. 5, is affixed for raising or lowering said cams and concave, and which lever is held in one of a series of notches in the bar C. Near each of the ends of the machine are placed two through shafts, one near each of said ends, as at D, which have their support in journal-bearings *c* on the frame, and upon each of these shafts, and at the points or parts thereof where they pass through the casing of the machine, they carry metallic heads E E, which are permanently attached to and a part of said shafts, so as to move with them as one piece. From the metallic heads or rims E on opposite sides of the machine extend two rods, *f g*, at or near the perimeters of said heads, and nearly diametrically opposite each other, as seen in the drawings, and upon the upper pair *f* of these rods are placed the slats F, which, with their projecting and inclined teeth *h*, form the shaking straw-carrier, which receives the material as it comes from the thrasher, and by its four motions, imparted to it through the rocking or rolling heads, separates the grain from the straw, the former dropping upon the carrier below it, and the latter retained and carried out at the rear of the machine, as will be hereafter explained. To the under pair of rods *g* is secured the grain-conveyer G, which receives the grain that is shaken out from the straw, and, carrying it rearward, delivers it onto a shoe or sieves. The rods *f g* being connected to the same pairs of heads at both front and rear, but at points nearly diametrically opposite to each other, and above and below the centers of motion of said heads, which are their shafts, and carrying, respectively, the carrier on the upper shafts, and the conveyer on the lower ones, give to said carrier and conveyer a compound forward and rearward, and approaching and receding, movement that accomplishes their purposes and objects thoroughly. The heads or rims E fit snugly in circular openings in the casing of the machine, so that while acting as cranks or crank-wrists, in their rolling or rocking movement, leave no openings through said casing for the escape of dust. The carrier, as will be seen in Fig. 4, is horizontal. The conductor or conveyer G is shown as slightly inclined, but may be also horizontal. The comparative lengths and arrangement of the carrier and conveyer, and their shafts, are also shown in Fig. 4. The inclined guide-boards for directing the grain as it is shaken from the straw in the carrier onto the conveyer, are shown better in Fig. 3, at *i*. The main body of the grain drops directly through between the slats or openings onto the conveyer. The heads or rims E, and their central shafts D, as above mentioned, are rigidly attached, so that they can only rock or roll together as though they were but a single piece, and on one side of the machine, there is connected to each of said heads and rocking shaft a crank-wrist, *j*, and these crank-wrists are in turn connected by a bar, H, to which one end of a pitman, *k*, is pivoted, the other end whereof is pivoted to a wrist on the crank-wheel *m*, from and by which motion is transmitted to said heads or rims, and through them to the carrier and conveyer. At the rear of the machine, as shown at Fig. 4, there is attached what is termed a stacker, I, which is a straw-carrier composed essentially of an endless belt, having a series of inclined teeth, *n*, which hold the straw dropped upon the belt from the carrier, and carry it up and deliver it on a stack. The carrying-belt is driven from the same power and by the same belt, J, that drives the other moving parts of the machine. The fan-shaft is placed at *o;* but these constitute no part of my present claims, and being shown in the drawings, need not be more particularly described.

Having thus fully described my invention, what I claim therein as new, and desire to secure by Letters Patent, is—

1. The combination, with the perforated casing, of the straw-carrier and grain-conveyer, both connected to and with the same rolling heads or rims, one above and the other below their centers of motion, so that the rocking or rolling of said heads, while fitting the circular openings in the case, shall impart to said carrier and conveyer a forward and rearward, and approaching and receding, movement, as and for the purpose described.

2. The combination of the rolling or reciprocating heads, the carrier and conveyer, and the crank-wrists and coupling-bar, for the purpose of imparting a positive and simultaneous movement to both of the pairs of heads, and to each of the ends of the carrier and conveyer, substantially as described and represented.

JOSEPH KOONS.

Witnesses:
A. W. GOSHORN,
R. WHISLER.